(12) United States Patent
Petrie

(10) Patent No.: US 12,358,781 B2
(45) Date of Patent: Jul. 15, 2025

(54) EQUINE CONTROL SYSTEM

(71) Applicant: Focus Force Pty Ltd, Templestowe (AU)

(72) Inventor: Harry Andrew Petrie, Templestowe (AU)

(73) Assignee: Focus Force Pty Ltd, Templestowe (AU)

( * ) Notice: Subject to any disclaimer, the term of this patent is extended or adjusted under 35 U.S.C. 154(b) by 0 days.

(21) Appl. No.: 17/625,115

(22) PCT Filed: Jul. 8, 2020

(86) PCT No.: PCT/AU2020/000061
§ 371 (c)(1),
(2) Date: Jan. 6, 2022

(87) PCT Pub. No.: WO2021/003515
PCT Pub. Date: Jan. 14, 2021

(65) Prior Publication Data
US 2022/0267139 A1  Aug. 25, 2022

(30) Foreign Application Priority Data
Jul. 8, 2019 (AU) .................................. 2019902422

(51) Int. Cl.
*B68B 1/12* (2006.01)
*A01K 13/00* (2006.01)

(52) U.S. Cl.
CPC .............. *B68B 1/12* (2013.01); *A01K 13/006* (2013.01)

(58) Field of Classification Search
CPC ............ B68B 1/10; B68B 1/12; A01K 13/006
(Continued)

(56) References Cited

U.S. PATENT DOCUMENTS 25,822 A * 10/1859 Hall .......................... B68B 1/06
54/11
214,866 A * 4/1879 Anschicks ................ B68B 1/06
54/11
(Continued)

FOREIGN PATENT DOCUMENTS

CN        106912397 A  *  7/2017
FR             334982 A  *  1/1904  ........... A01K 13/006
(Continued)

*Primary Examiner* — Peter M Poon
*Assistant Examiner* — Hae Rie Jessica Byun
(74) *Attorney, Agent, or Firm* — Bochner PLLC; Andrew Bochner; Eric Kleinertz

(57) ABSTRACT

There is disclosed a control device for an equine, comprising a hood adapted to be positioned over a head of the equine, the hood having a pair of eye openings to accommodate the equine's eyes; a retractable cup member mounted at least partially about the eye openings of the hood; and an activation device mounted on said hood so as to be activated by a rider of the equine to move the retractable cup member between a non-activated state and an activated state; wherein when the retractable cup member is in the non-activated state the retractable cup member does not substantially restrict the field of vision of the equine and when the retractable cup member is in the activated state the retractable cup member restricts the field of vision of the equine.

14 Claims, 4 Drawing Sheets

(58) Field of Classification Search
USPC .......................................................... 54/10, 11
See application file for complete search history.

(56) References Cited

U.S. PATENT DOCUMENTS

| | | | | | |
|---|---|---|---|---|---|
| 351,863 | A | * | 11/1886 | Hanks | B68B 1/12 |
| | | | | | 54/11 |
| 368,365 | A | * | 8/1887 | Adams | B68B 1/06 |
| | | | | | 54/11 |
| 455,480 | A | * | 7/1891 | Dannhauser | B68B 1/06 |
| | | | | | 54/11 |
| 463,962 | A | * | 11/1891 | Von Briesen | B68B 1/06 |
| | | | | | 54/11 |
| 661,375 | A | * | 11/1900 | Mack | B68B 1/06 |
| | | | | | 54/11 |
| 923,289 | A | * | 6/1909 | Moore | B68B 1/06 |
| | | | | | 54/11 |
| 4,261,293 | A | * | 4/1981 | Djernes | B68B 1/10 |
| | | | | | 119/422 |

FOREIGN PATENT DOCUMENTS

| | | | | | |
|---|---|---|---|---|---|
| FR | 366794 | A | * | 10/1906 | B68B 1/12 |
| WO | WO-2012163786 | A1 | * | 12/2012 | A01K 13/00 |
| WO | WO 2020124113 | A1 | * | 12/2018 | |

* cited by examiner

EQUINE CONTROL SYSTEM

RELATED APPLICATION(S)

The present application claims priority from Australian Provisional patent Application No. 2019902422 filed on 8 Jul. 2019, the entire contents of which are incorporated herein by reference.

FIELD OF INVENTION

The present invention relates generally to a system and device for controlling an equine, and in particular, to a system and device that is worn by the equine and which is used in a racing environment for controlling the behaviour of the equine.

BACKGROUND OF THE INVENTION

Horseracing is a well-established and popular activity in many nations around the world. Many horses, such as thoroughbreds, are bred for racing due to their natural speed and agility. Due to the popularity of wagering on horseracing, much money is invested into breeding and training horses which has resulted in the horseracing industry becoming a highly regulated industry employing a large number of people.

Horses typically race under controlled conditions with rules and regulations for racing determined by overseeing regulatory bodies. As wagering on the outcome of a race can offer large returns, the overseeing regulatory bodies spend considerable effort on employing dedicated professionals, called Stewards, to oversee the actions of the various participants to ensure the outcome and integrity of the race is maintained.

Therefore, there are rules and regulations associated with how the horses are trained and the conditions in which they race to ensure that the safety of the competing horses and jockeys is paramount and that the result of the race is fair and uncompromised. Thus, there exist numerous types of equipment that have been endorsed by the regulatory bodies to be worn by the horse and/or carried by the jockey to maximise the effort put in by the horse to win a race. Such types of equipment include whips, saddles and other equipment that enables that provide a degree of control over the horse's behaviour during a race.

Blinkers or blinders refer to equipment that is worn by a horse in the form of a hood with eye cups. The equipment functions by limiting the horse's field of vision during a race. Such equipment is relatively common at a racetrack and is a tool used by most horse trainers to address behavioural issues of a horse to ensure that they perform to their maximum potential during a race.

Blinkers work by limiting a horse's field of vision. Due to the shape and configuration of a horse's head, horses have generally two types of vision, monocular vision and binocular vision. Monocular vision enables a horse to see almost completely around their body and behind them due to their eyes being set on the side of their head. This type of vision has been important in the evolution of horses as they are prey animals and such monocular vision enables a horse to be alert to the presence of predators, even when they have their heads down while grazing. Due to the horse's eyes being towards the front of their head, they also have binocular vision that allows them to focus on what is directly ahead of them.

Blinkers are typically employed to limit the horse's monocular vision and therefore what is available for the horse to see, in an attempt to improve the horse's focus. Whilst horses may react to the effect of blinker's differently, it is generally established that with such an improved focus the horse may break from the starting gates or barriers faster as they are not as distracted by the handlers and other horses at the barriers. Similarly, some horses may be reactive to seeing a rider on their back and the use of blinkers removes the rider from their field of vision to reduce this effect. However, the increased focus provided by the blinkers may also have an adverse effect on the horse's performance during a race. This can result in the horse becoming so focussed on the racetrack ahead of them that the jockey is unable to slow or "rate" the horse during a race such that they are unable to conserve the horse's energy to finish off the race appropriately.

Thus, whilst blinkers may be a useful mechanism for focussing a horse during one part of the race, it may have detrimental impact on the horse's performance during another part of the race. For this reason, other devices such as cheaters or winkers have been employed. Such devices function to only partially limit the field of vision of the horse to a much lesser extent than blinkers. Whilst such variations exist, their ability to focus the horse only on the racetrack ahead of them is removed as they allow some monocular vision which can distract the horse. Thus, in such situations the jockey is often only able to use the whip to impact upon the horse's ability to focus and race. This is not ideal as many sections of the public view the jockey's use of the whip as being cruel and unjust to the animal.

Thus, there is a need to provide an apparatus or system of devices that provides the ability for the jockey to focus the horse only on the racetrack ahead of them in the manner in which blinkers do, but which can be selectively activated by the jockey to be used at times when such focus is necessary.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided a control device for an equine, comprising:
  a hood adapted to be positioned over a head of the equine, the hood having a pair of eye openings to accommodate the equine's eyes;
  a retractable cup member mounted at least partially about the eye openings of the hood; and
  an activation device mounted on said hood so as to be activated by a rider of the equine to move the retractable cup member between a non-activated state and an activated state;
  wherein when the retractable cup member is in the non-activated state the retractable cup member does not substantially restrict the field of vision of the equine and when the retractable cup member is in the activated state the retractable cup member restricts the field of vision of the equine.

In one embodiment, each retractable cup member is mounted about a rear edge of the eye openings of the hood. When each retractable cup member is in the activated state the retractable cup member may extend from the rear edge of the eye opening to cover between 5-75% of the eye opening. In one preferred form, when each retractable cup member is in the activated state the retractable cup member extends from the rear edge of the eye opening to cover at least 50% of the eye opening. In another preferred form, when each retractable cup member is in the activated state the retractable cup member extends from the rear edge of the eye opening to cover at least 25% of the eye opening.

The activation device may comprise a button which is activated by the rider of the equine to activate the retractable cup members. In one embodiment, the retractable cup members may be mechanically activated by a cable connected to the button. In another embodiment, the retractable cup members may be electronically activated by a wired connection between the button and the retractable cup members. In yet another embodiment, the retractable cup members may be electronically activated by a wireless connection between the button and the retractable cup members.

The activation device may further comprise a controller that detects activation of the button by the rider and transmits a control signal to control activation of the retractable cup members. The controller may further comprise a transmitter to transmit a signal indicative of a state of activation of the retractable cup members. Each of the retractable cup members may comprise a sensor that senses the state of activation of the retractable cup members for transmission by the controller.

Each retractable cup member may be biased toward the activated state. Upon activation of the activation device by the rider, the activation device may release the retractable cup member from the retracted non-activated state to the biased activated state.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The apparatus of the present invention will be described below in relation to its use in controlling a racehorse during a race. However, it will be appreciated that the apparatus could be used in a variety of different applications, outside of racing, for controlling an animal, other than a horse, by restricting the animal's field of view. Further, the present invention will be described below in relation to use as a conventional blinker/blinder. However, it will be appreciated that the present invention could be adapted for use as a quarter cup, slotted cup, or a cheater and still fall within the intended scope of the present invention.

Figure 1:
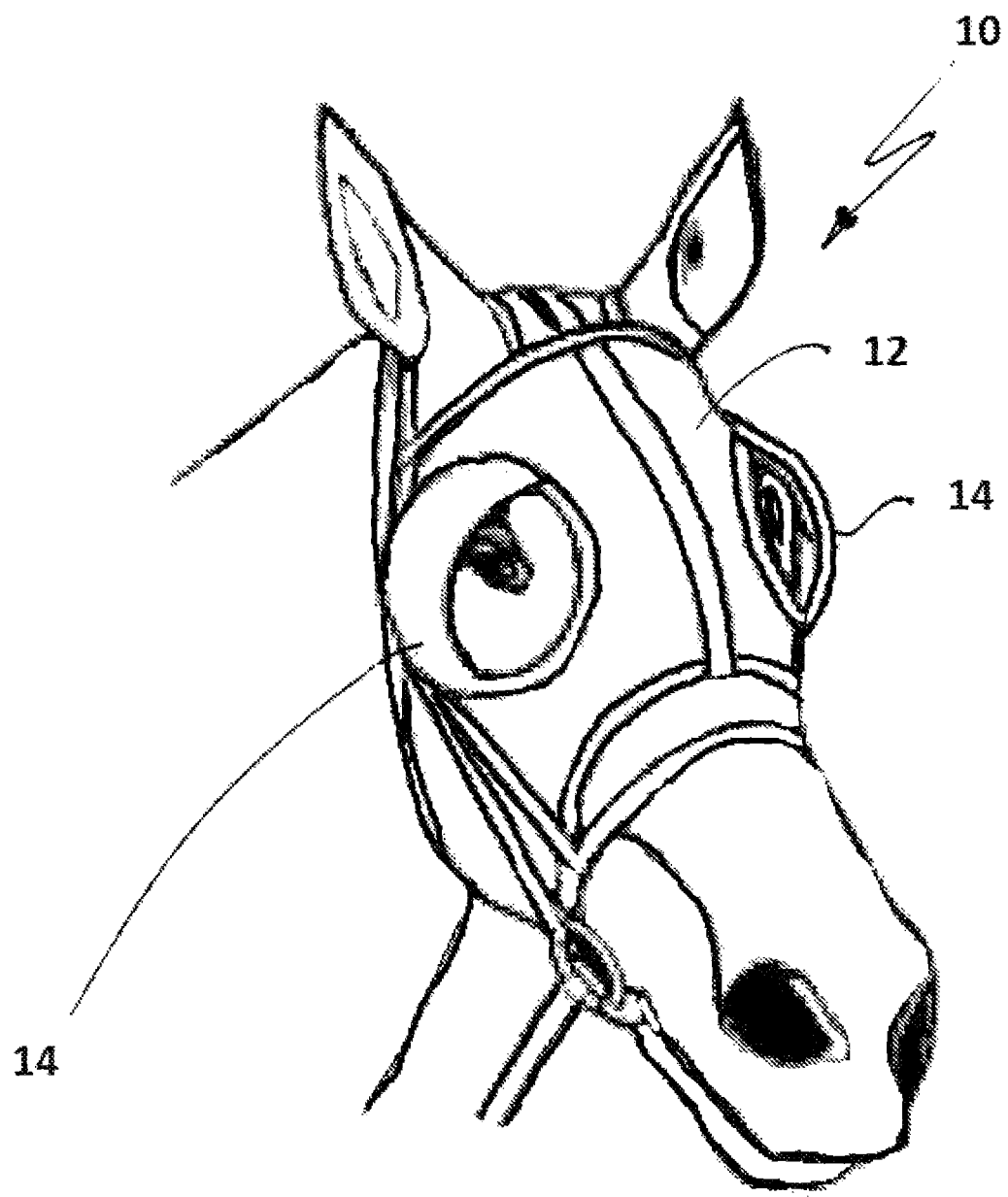
FIG. 1 is a blinker/blinder arrangement as is known in the prior art.

Referring to FIG. 1, there is disclosed a conventional blinker/blinder arrangement in accordance with the prior art. The blinker arrangement 10 comprises a hood 12 that is configured to be fitted over the head of the horse as shown. The hood 12 is essentially worn on the forehead and has holes formed therein through which the horse's ears protrude and an additional hole to accommodate the horse's muzzle. Straps may be employed to secure the hood 12 in place. The hood 12 is typically worn under a bridle and is made from a canvas type material although other types of materials are also envisaged to provide comfort to the horse when worn. Eye recesses 13 are also formed in the hood 12 to accommodate the horse's eyes as shown.

Cups 14 are secured to the hood 12 about the eye recesses 13. The cups 14 are essentially half cups in that they cover around 50% of the eye recess 13, extending from the rear thereof. In this regard, the cups 14 do not fully enclose the eye recesses and are open at the front, as depicted. When worn in this manner, the cups 14 limit the horse's field of vision such that they can only see what is directly ahead, namely in their binocular field of vision. The cups 14 may be made from a plastic or hard rubber material such that they maintain their structure during use.

It will be appreciated that the blinker arrangement 10 of FIG. 1 is typically worn by the horse to alter their behaviour such that the horse is more focussed on the path directly ahead of them, rather than being distracted by numerous other objects that they may see in their monocular vision. However, it will be appreciated that due to the nature of the arrangement 10, it is not possible to vary the amount of the horse's vision that is limited by the cups 14 during a race, especially if the horse becomes too focussed and difficult for the jockey to restrain or "rate".

For this purpose, the blinker arrangement 20 of the present invention is proposed. The blinker arrangement 20 is configured to function in much the same manner as that described and shown in FIG. 1 when in an activated state. However, when not activated, the blinker arrangement 20 is configured to have no or minimal effect on the behaviour of the horse.

The blinker arrangement 20 comprises a hood 22 configured to be fitted over the head of the horse. The hood 22 extends over the horse's forehead and to the back of the head of the horse and has recesses to accommodate the horse's ears. Straps may extend under the horse's head to retain the hood 22 in the position as shown.

Figure 2:
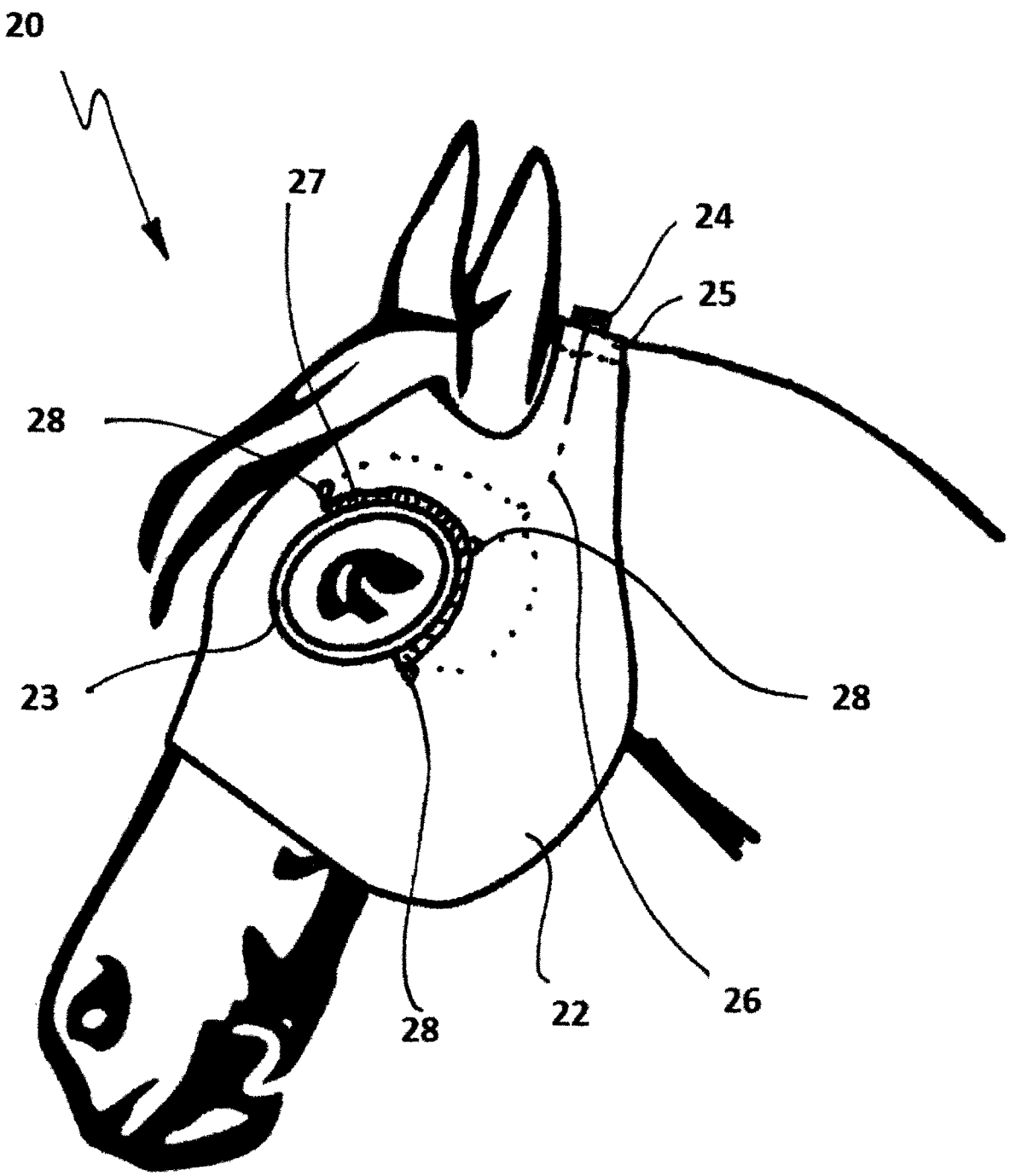
FIG. 2 depicts a blinker/blinder arrangement of the present invention with the blinker in the non-activated position.

Eye recesses 23 are provided in the hood 22 to extend about the horse's eyes when the hood 22 is fitted. A retractable cup 27 is mounted about the rearward half of the eye recesses 23 in the manner as shown in FIG. 2. In one embodiment, the retractable cup 27 is typically made from a durable and resilient material, such as rubber, which is configured to be folded in a concertina manner against the surface of the hood 22, when not activated.

A button 24 or similar activation device is mounted to the surface of the hood 22 to be located atop the horse's head, between the ears of the horse. The button 24 projects beyond the surface of the hood 22 so as to be readily accessed by the horse's jockey or rider. The system of the present invention will be activated by the jockey or rider when the jockey or rider reaches their arm up to depress the button 24.

A controller 25 is incorporated within the hood 22. The controller 25 may comprise a small computer microprocessor that detects when the button 24 has been activated and sends a signal to one or more actuators 28 to activate the retractable cup 27 into an extended position. A plurality of wires 26 may extend from the controller 25 to each actuator 28 to transmit signals to control the state of the retractable cup 27. In another embodiment, the controller 25 communicates with each actuator 28 wirelessly.

Figure 3:
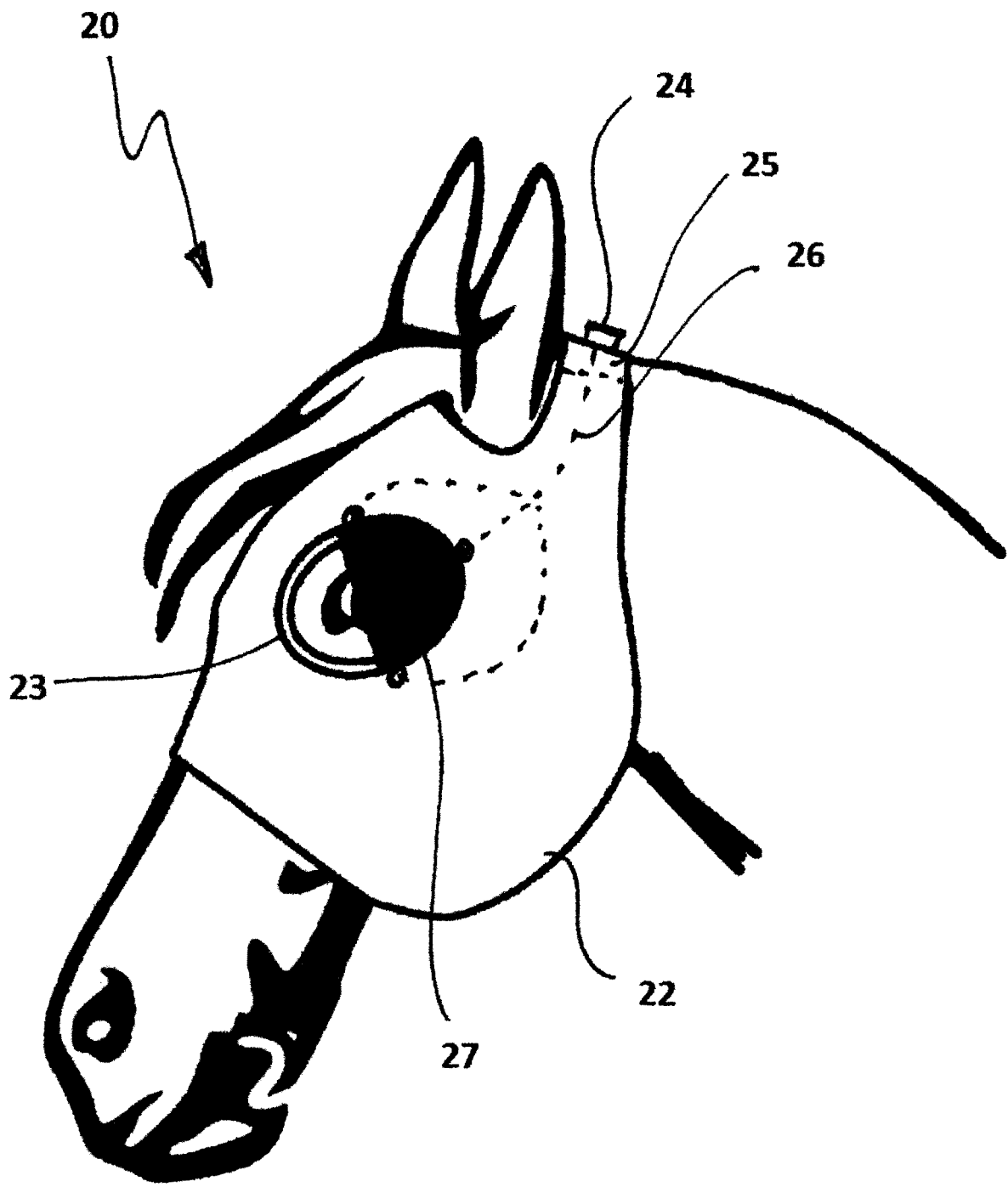
FIG. 3 depicts a blinker/blinder arrangement of the present invention with the blinker in the activated position.

As the retractable cup 27 is made from a resilient rubber material, it is naturally biased towards an extended position as depicted in FIG. 3. In the extended position, the cup extends across around 50% of the eye recess 23. Therefore, when the retractable cup 27 is in the retracted concertina configuration of FIG. 2, the actuators 28 function to retain the retractable cup 27 in this retracted position against the natural bias of the cup 27. Upon the jockey or rider activating the button 24, the controller 25 sends a signal to each actuator to release the retractable cup 27, thus activating the blinker arrangement 20 in the manner as shown in FIG. 3.

Figure 4:
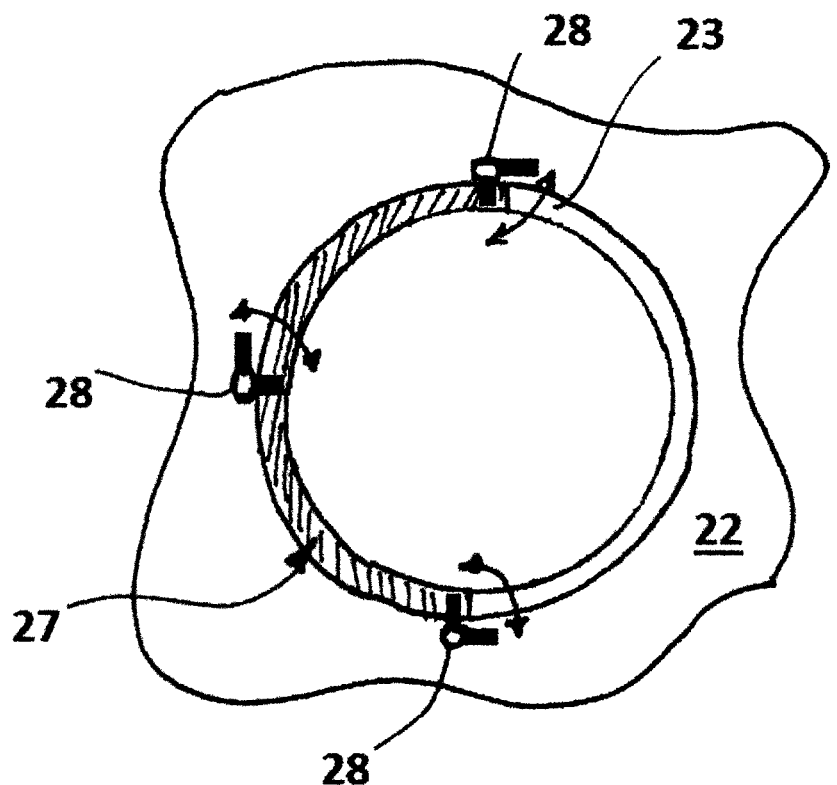
FIG. 4 is a top view of the blinker arrangement of the present invention showing the cup in the non-activated position.
Figure 5:
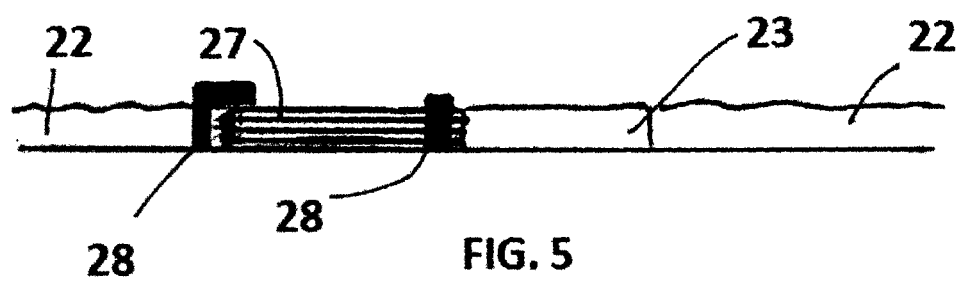
FIG. 5 is a side edge view of the blinker arrangement of the present invention showing the cup in the non-activated position.
Figure 6:
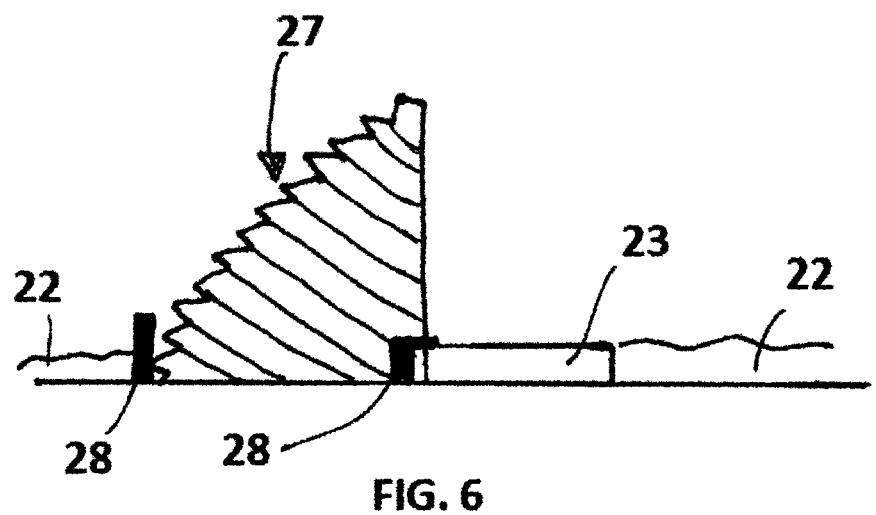
FIG. 6 is a side edge view of the blinker arrangement of the present invention showing the cup in the activated position

FIGS. 4-6 depict one embodiment of how this is achieved. FIG. 4 depicts the retractable cup 27 in the retracted or concertina position. In this position the cup 27 is retained to be substantially flat or level with the outer surface of the hood 22 and is positioned at the rear end of the eye recess 23. It is retained in position by the actuators 28, in the form of tabs or fingers that physically extend over the cup 27 to hold the retractable cup 27 in position, as shown in FIGS. 4 and 5.

Upon activation of the button 24, a signal is sent from the controller 25 to the actuators 28 to cause the actuators 28 to rotate through 90°. This then releases the retractable cup 27 from its retracted or concertina configuration. Due to the biased form of the cup 27, upon release the cup 27 is caused to expand to the configuration as depicted in FIG. 6 where it covers around 50% of the eye recess. In this position the arrangement 20 is able to function as a conventional blinker device to change the behaviour of the horse accordingly.

With the arrangement as depicted in FIGS. 4-6, the blinker arrangement 20 is either activated or deactivated, meaning that the blinkers can only be employed once during a race. In this arrangement, the jockey may determine that the best time to activate the blinkers is in the home straight over the last 200 metres, where the horse can focus on completing the race. Therefore, when the jockey is 200 m from the post they can simply activate the button 24 and activate the blinkers to focus the horse, which may obviate the need for the jockey to employ the whip or similar means to urge the horse to the finish line. Such an outcome will have considerable appeal to racing authorities as it removes the need for the jockey to apply the whip during the race, thereby overcoming many negative connotations associated with whip use.

It will be appreciated that the mechanism for activating and deactivating the retractable cup 27 may take a variety of forms. In an alternative embodiment (not shown), the retractable cup may be mounted on a plurality of push arms which are activated to extend the retractable cup 27 from the retracted position of FIG. 2 to an extended position as shown in FIG. 3. In such an arrangement the retractable cup 27 is not biased towards the extended position but is passive and the push arms cause the cup 27 to move between a retracted and an extended position. By using such a mechanism, it may be possible for the jockey to activate and deactivate the blinkers numerous times within a race, to more actively control the behaviour and focus of the horse.

Alternatively, rather than a cup 27, the arrangement may employ a disc or shutter, or other similar item having a substantially flat shape, which can be extended and retracted over the eye recesses accommodating the horse's eyes. Such a device can be electronically activated/deactivated by the controller 25 in accordance with the jockey's requirements.

In yet another embodiment of the present invention, a purely mechanical means may be employed to activate/deactivate the blinkers. In this regard, a push pull cable (not shown) may be provided connecting the cup 27 to the activation button 24 on the hood 22. The cable may connect to a spring loaded cup 27 that is made from a fabric material such that release of the springs by the cable causes the fabric material to extend under action of the springs to function as a blinker.

The blinker arrangement 20 of the present invention provides a simple means by which a jockey or rider can tailor the use of blinkers to suit the racing requirements of each horse. As some horses will react differently to blinkers within a race, a jockey can assist the horse to focus on the race in a manner that is more suited to the horse's nature. This is significantly different to existing blinker arrangements which are either on or off.

As the blinker arrangement of the present invention employs a computer controller 25, it may be possible for the controller to determine and record the usage of the blinkers within a race. This may involve the controller measuring the time in which the blinker is activated and the position around the track where this has occurred. This information can be transmitted from the controller 25 to course officials and/or spectators to inform them of any change in the racing conditions. Similarly, the controller 25 may include a receiver capable of receiving signals from a transmitter which can remotely activate the blinker. This may be relevant where a rule is introduced by authorities to ban use of the whip or crop whereas in the last 200 metres all blinkers are activated automatically to keep the horse focussed on competing the race. An electronic sensor device may also be used to monitor the state of the blinker unit and transmit a signal to the Stewards during a race indicative of the state of the blinker, or when the blinker has been activated. The Stewards can then determine whether the device was used in an appropriate manner and activated at the appropriate time, as governed by racing laws.

It will be appreciated that whilst the cup 27 of the blinker arrangement of the present invention has been described as being a cup that extends across 50% of the eye recess, it is also envisaged that the cup 27 could cover any proportion of the eye recess as deemed necessary. In this regard, the activated cup 27 could be a quarter cup that covers 25% of the eye recess, or any other range of coverage.

Irrespective of how the blinker arrangement of the present invention may be employed during a race, the ability to have an actuable blinker arrangement that provides a jockey/rider with another means for controlling the behaviour of the horse during a race is extremely beneficial. Access to such a passive control means offers significant advances in relation to animal welfare as well as ensuring that maximum effort can be extracted from the horse during a race. The ability to activate blinkers at a time during the race that best suits the natural behavioural instincts of a horse enables trainers to trailer the blinker arrangement to their horse's needs for greater success on the racetrack.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The invention claimed is:

1. A control device for an equine, comprising:
   a hood adapted to be positioned over a head of the equine, the hood having a pair of eye openings to accommodate the equine's eyes;
   at least one retractable cup member, the at least one retractable cup member mounted at least partially about the eye openings of the hood; and
   an activation device mounted on said hood to be activated by a rider of the equine as the rider is mounted on the equine to move the at least one retractable cup member between a non-activated state and an activated state; and
   a controller for determining a state of activation of the at least one retractable cup member;
   wherein when the at least one retractable cup member is in the non-activated state the at least one retractable cup member does not substantially restrict the field of vision of the equine and when the retractable cup member is in the activated state the retractable cup member moves to partially restrict the field of vision of the equine and wherein the controller is configured to detect and record when the activation device has been activated by the rider.

2. The control device according to claim 1, wherein the at least one retractable cup member is mounted about a rear edge of the eye openings of the hood.

3. The control device according to claim 2, wherein when the at least one retractable cup member is in the activated state the at least one retractable cup member extends from the rear edge of the eye opening to cover between 5-75% of the eye opening.

4. The control device according to claim 3, wherein when the at least one retractable cup member is in the activated state the at least one retractable cup member extends from the rear edge of the eye opening to cover at least 50% of the eye opening.

5. The control device according to claim 3, wherein when the at least one retractable cup member is in the activated state the at least one retractable cup member extends from the rear edge of the eye opening to cover at least 25% of the eye opening.

6. The control device according to claim 1, wherein the activation device comprises a button which is actuable by the rider of the equine to activate the at least one retractable cup member.

7. The control device according to claim 6, wherein the at least one retractable cup member is activated by a cable connected to the button.

8. The control device according to claim 6, wherein the at least one retractable cup member is electronically activated by a wired connection between the button and the at least one retractable cup member.

9. The control device according to claim 6, wherein the at least one retractable cup member is electronically activated by a wireless connection between the button and the at least one retractable cup member.

10. The control device according to claim 8 or claim 9, wherein the controller determines the state of activation of the at least one retractable cup member by detecting activation of the button by the rider and transmits a control signal to control activation of the retractable cup members.

11. The control device according to claim 10, wherein the controller further includes a transmitter to transmit a signal indicative of the state of activation of the at least one retractable cup member.

12. The control device according to claim 11, wherein the at least one retractable cup member comprises a sensor that senses the state of activation of the at least one retractable cup member and feeds a signal to the controller to indicate the state of activation of the at least one retractable cup member.

13. The control device according to claim 1, wherein the at least one retractable cup member is biased toward the activated state.

14. The control device according to claim 13, wherein, upon activation of the activation device by the rider, the activation device releases the retractable cup member from the retracted non-activated state to the biased activated state.

* * * * *